3,219,719
β-METHYL NAPHTHALENE PURIFICATION AND RECOVERY
Abraham Schneider, Overbrook, Pa., assignor to Sun Oil Company, Philadelphia, Pa., a corporation of New Jersey
No Drawing. Filed Aug. 7, 1962, Ser. No. 215,287
6 Claims. (Cl. 260—668)

This invention relates to the isomerization of dicyclic naphthenes having eleven carbon atoms to form two specific isomers of methyldecalin. The invention further embraces the separation of these isomers from each other and production of one of the isomers as the main product of the process. This product is particularly useful for conversion to β-methylnaphthalene.

Methyl naphthalene as obtained from sources such as petroleum and coal tar generally is composed of a mixture of the alpha and beta isomers in which each component is present in substantial amount. A suitable means of obtaining the beta isomer in high yield from such mixture is desirable, since β-methylnaphthalene is a useful intermediate for preparing various chemical products such as dyes and pharmaceuticals. The beta isomer can be selectively crystallized from the isomer mixture, but this procedure is not entirely satisfactory. The presence of the alpha isomer in substantial proportion in the charge material tends to cause the purity of the beta product to be lower than is desirable and also to result in a poor yield. In many cases the isomer mixture can be improved as charge for the crystallization operation by first isomerizing it by means of a catalyst such as aluminum halide to increase the proportion of the beta isomer therein. However, the resulting isomerization product also is not particularly suitable for yielding pure β-methylnaphthalene, for the reason that the alpha isomer constitutes roughly one-quarter of the isomerization product and hence is still present in high enough amount to adversely affect the purity and yield of the beta product.

The present invention provides an improved method for deriving high purity β-methylnaphthalene from isomeric mixtures of the methylnaphthalenes. The procedure involves first converting the mixture to methyldecalins by hydrogenation. The methyldecalins are then isomerized under the conditions herein described. While there are eight methyldecalin isomers that might be expected to be present in the isomerization product, I have found that the product will contain essentially only two isomers and that one of them, which has its methyl group in the 2-position, is present in preponderant amount. Typically the ratio of this particular isomer to the other one is 5–6 to 1. Fortuitously this main isomer has a freezing point which is considerably higher than that of the other isomer, so that it can be separated therefrom by fractional crystallization. The fact that the proportion of this isomer in the isomerized mixture is high facilitates its separation by crystallization. By recycling the other isomer to the isomerization step, essentially all of it can be converted to the main isomer. The latter upon dehydration yields β-methylnaphthalene of high purity. Hence the foregoing procedure results in an unusually high yield of β-methylnaphthalene from the original mixed methylnaphthalene isomers.

As mentioned above, there are eight isomers of methyldecalin that could be expected to be obtained under isomerization conditions, not including the unlikely isomers in which the methyl group is located at a ring junction. Four of these eight isomers have the methyl substituent at the 1-position and the other four have it at the 2-position. These isomers can be represented by the following structural formulas in which the heavy dots represent hydrogen atoms projecting from the molecule toward the observer.

|   | Melting point, ° C. | Boiling point, ° C. |
|---|---|---|
| trans-syn-2-methyldecalin | −39 | 203 |
| trans-anti-2-methyldecalin | Very low | 205 |
| cis-syn-2-methyldecalin | −12 | 209 |
| cis-anti-2-methyldecalin | Very low | 210 |
| trans-anti-1-methyldecalin | Very low | 205 |
| trans-syn-1-methyldecalin | −30 | 210 |
| cis-anti-1-methyldecalin | Very low | 211 |
| cis-syn-1-methyldecalin | Very low | 213 |

The methyldecalins obtained by hydrogenating a mixture of cis and trans methylnaphthalenes by means of a catalyst such as Raney nickel or platinum-on-alumina are composed mainly of the cis-syn compounds. While it might have been supposed that isomerization of these compounds using a catalyst such as aluminum halide would lead to the formation of an equilibrium mixture containing substantial amounts of all of the eight isomers shown in the tabulation above, such is not the case. I have found that such isomerization produces essentially only two isomers, namely, the trans-syn-2-isomer and the trans-anti-1-isomer. Furthermore the trans-syn-2-isomer fortuitously is present in the reaction product made by the present process to the extent of about 81–86%. It is further fortuitous that this isomer has a melting point of −39° C. whereas the trans-anti-1-isomer has a very low melting point, by which is meant that it will not freeze using conventional procedures with Dry Ice as the cooling medium. Hence, it is apparent that the trans-syn-2-isomer can be separated from the isomerization product by fractional crystallization at a temperature below −40° C., for example, at −70° C. If desired, the trans-anti-1-methyldecalin can be recycled to the isomerization zone, so that substantially complete conversion of all the methyldecalin into the trans-syn-2-compound can be achieved.

The process according to the invention is carried out by contacting the $C_{11}$ dicyclic naphthene at a temperature in the range of −10° c. to 80° c., more preferably, 0–30° C., with a catalyst which can be an $AlCl_3$—HCl catalyst, an $AlBr_3$—HBr catalyst or an HF—$BF_3$ catalyst. The contacting is continued until at least a major proportion of the starting naphthene has been converted to the equilibrium mixture of methyldecalins and preferably until essentially all of it has been so converted. Thereafter the hydrocarbon product can be separated from the catalyst and trans-syn-2-methyldecalin can be recovered from the product by selective crystallization at a temperature sufficiently below −40° C.

As indicated above, the isomerization can be effected by an aluminum halide catalyst obtained by combining $AlCl_3$ with HCl or $AlBr_3$ with HBr. With either aluminum halide the catalyst preferably is a liquid complex obtained by reacting the aluminum halide and hydrogen halide in the presence of one or more paraffin hydrocarbons having at least seven and more preferably at least eight carbon atoms. When $AlCl_3$ is used it is preferable to use paraffin hydrocarbons which have more than eight carbon atoms. This complex type of catalyst is insoluble in the reaction mixture, and the activity of the catalyst depends upon having at least a small amount of uncomplexed $AlCl_3$ or $AlBr_3$ present therein. When the aluminum halide in $AlCl_3$, it is also desirable to maintain a relatively high partial pressure of HCl, such as 100–500 p.s.i., in the reaction zone to increase catalytic activity. With $AlBr_3$ a high partial pressure of HBr is not needed and high activity is obtained as long as there is a slight partial pressure of HBr. The catalyst complex is a colored mobile liquid and typically in the case of $AlBr_3$ is bright orange-yellow.

In preparing the aluminum halide complex any paraffin hydrocarbon or mixture of such paraffins having seven or more carbon atoms can be used, but it is desirable to use a branched paraffin, e.g., one having at least two branches, in order to reduce the time for preparing the complex and it is particularly preferred that such isoparaffins have at least eight carbon atoms per molecule. A slow degradation of the catalyst may occur over a course of time, particularly when $AlBr_3$ is used to make the catalyst, but the addition of a small amount of fresh aluminum halide from time to time will reactivate the catalyst. Also a portion or all of the catalyst complex can be replaced from time to time by fresh catalyst complex to maintain catalytic activity.

Preparation of the catalyst complex comprises dissolving or suspending the aluminum halide in the paraffin hydrocarbon and passing the hydrogen halide into the mixture. This can be done at room temperature, although the use of an elevated temperature such as 50–100° C. generally is desirable to increase the rate of reaction. For best results at least five moles of the paraffin per mole of $AlCl_3$ or $AlBr_3$ should be employed. Under these conditions some of the paraffin evidently breaks into fragments, yielding a $C_4$ fragment which becomes the hydrocarbon portion of the complex. In the case of $AlBr_3$, as the reaction proceeds the mixture becomes milky and the orange-yellow liquid complex then precipitates from the hydrocarbon phase. Addition of HBr is continued until the milky appearance has disappeared. For obtaining the most active catalyst complex the addition of HBr should be stopped at this point. When $AlCl_3$ is used to make the catalyst, such milky appearance does not appear as the HCl is added. Instead the particles of $AlCl_3$ in suspension in the hydrocarbon merely become converted to the liquid complex. The addition of HCl is stopped before all of the $AlCl_3$ reacts so that the complex formed will contain some $AlCl_3$ particles suspended therein. The resulting complexes made with either $AlCl_3$ or $AlBr_3$ are relatively stable mateirals.

When the aluminum halide is $AlBr_3$, the catalyst can also be used with the $AlBr_3$ dissolved in the hydrocarbon reactant so that the reaction mixture is homogeneous. When using this type of catalyst system, the $AlBr_3$ is dissolved in the methyldecalin charge to the extent of 5–200% by weight on the hydrocarbon and HBr is pressured into the mixture in amount of at least 0.25% by weight of the hydrocarbon. The resulting reaction mixture remains homogeneous as the reaction occurs. With $AlCl_3$ a homogeneous system cannot be used since $AlCl_3$ is essentially insoluble in hydrocarbons.

In utilizing the aluminum halide catalysts described above, the reaction is effected by contacting the catalyst with the methyldecalin charge at a temperature in the range of −10° C. to 80° C. and more preferably 10−30° C. When using the complex form of catalyst, the reaction mixture should be vigorously agitated to provide intimate contact between the hydrocarbon and catalyst phases. The volume ratio of hydrocarbon to catalyst can vary widely, for example, from 0.1:1 to 20:1, and the necessary reaction time to effect complete isomerization to the equilibrium mixture of isomers will increase as the hydrocarbon to catalyst proportion increases. The time is also dependent upon the reaction temperature selected. When the charge to the isomerization is methyldecalin, less time is generally required at a given hydrocarbon to catalyst ratio and given reaction temperature than when other $C_{11}$ dicyclic naphthenes are used as charge. When starting with a methyldecalin charge and hydrocarbon to aluminum halide complex ratios of 1:1 to 3:1, complete isomerization to equilibrium typically can be attained in 5 minutes to 2 hours, depending upon the reaction temperature employed.

After the desired degree of conversion has been reached, the reaction mixture can be settled to separate the catalyst complex phase from a hydrocarbon phase and the catalyst complex can be recycled and reused. The hydrocarbon phase can, if desired, be washed with water to remove any catalyst residues prior to being subjected to fractional crystallization. When $AlBr_3$-HBr is used as a soluble catalyst, the HBr and hydrocarbons can be separately recovered by distillation from the $AlBr_3$, and the recovered $AlBr_3$ and HBr can be recycled for reuse.

Besides the aluminum halide catalysts described above, HF-$BF_3$ catalysts can also be used at the same temperature conditions to practice the present process. This type of catalyst system is made from hydrogen fluoride and boron trifluoride together with an initiator. The initiator can be either water or an organic compound containing not more than five carbon atoms which is an olefin, alcohol, ether or alkyl halide. Examples of such organic compounds are ethylene, propylene, isobutylene, pentenes, ethanol, i-propanol, tertiary butanol, 1-pentanol, dimethylether, diethylether, methylisopropylether, dibromomethane, 1-chloropropane, dichloropentanes and the like. The amount of initiator used generally should be 0.005 to 0.3 mole per mole of the $C_{11}$ dicyclic naphthene charge and more preferably 0.01 to 0.10 mole per mole. The HF and $BF_3$ each can be used in amounts as low as one mole per mole of initiator but the isomerization rate is maximized by using an excess of each. The amount of HF employed preferably is 25 to 300 moles per mole of initiator, while the amount of $BF_3$ preferably is 5 to 50 moles per mole of initiator. To insure an excess of $BF_3$ the reaction system preferably is maintained under a $BF_3$ partial pressure of 50–200 p.s.i. The resulting $HF$-$BF_3$ catalyst complex is insoluble in the hydrocarbon charge and is contacted therewith in the same manner as when the aluminum halide complex is used. This effects isomerization of $C_{11}$ dicyclic naphthenes in the same way as when the aluminum halide complex is used and produces the same equilibrium mixture composed essentially of the two methyldecalin isomers in the proportions described above.

When the invention is practiced utilizing mixed methylnaphthalenes as starting material, the methyldecalin charge for the isomerization step is made by hydrogenating the methylnaphthalenes employing a suitable catalyst. One suitable catalyst for this purpose is Raney nickel. Appropriate hydrogenation conditions when using this catalyst include a temperature of 200–275° C., a hydrogen pressure of 2000–4000 p.s.i.g., a catalyst to hydrocarbon weight ratio of 1:4 to 1:10 and a reaction time of 2–12 hours. Other suitable catalysts that can be used include platinum, cobalt molybdate, nickel tungstate, or nickel sulfide-tungsten sulfide, with these hydrogenating components being deposited on alumina. Platinum reforming catalyst available commercially can be used for this purpose. These other catalysts generally are used at the same pressure but at higher temperatures than Raney nickel, such as 300–400° C., in order to effect complete hydrogenation of the methylnaphthalenes.

The following example illustrates what can be achieved by isomerizing hydrogenated methylnaphthalenes in accordance with the invention.

EXAMPLE

The isomerization charge was a mixture of methyldecalins, composed mainly of the cis-syn-isomers, produced by hydrogenating mixed methylnaphthalenes using a Raney nickel catalyst at 200–250° C. and a pressure of about 2500 p.s.i.g. A catalyst complex was prepared by bubbling HBr into a mixture of 5 g. of $AlBr_3$ and 8 ml. of mixed dimethylhexanes at about 50° C. for about 30 minutes. Thereafter the unreacted hydrocarbons were decanted from the catalyst complex layer and about 3 ml. of the layer were obtained. This was a mobile oily liquid having an orange-yellow color. The reaction was carried out in a rocker bomb by contacting the catalyst with 5 ml. of the methyldecalin product from the hydrogenation. The temperature initially was maintained at 28–27.6° C. and small samples of the hydrocarbon product were taken for analysis at total reaction times of 60 and 108 minutes. Then the temperature was lowered to 0° C. and samples of the hydrocarbon product were taken for reaction times at this temperature level of 50 and 150 minutes. Thereafter the temperature was raised to 57.2–58.6° C. and samples were taken for times at this higher temperature of 15 and 35 minutes. Analysis was done by vapor phase chromatography. It was found that for each of the three temperature levels the two samples taken contained about the same proportion of methyldecalin isomer products, showing that in each case isomerization equilibrium had been reached at the earlier time of sampling and that the additional reaction time was unnecessary. At each temperature the product was composed of a major amount of trans-syn-2-methyldecalin and a minor amount of trans-anti-1-methyldecalin with other isomers being present only in negligible amounts. The ratios of the trans-syn-2-compound to the trans-anti-1-compound for the three temperature levels are shown in the following tabulation:

| Temperature: | Ratio of trans-syn-2 to trans-anti-1 |
|---|---|
| 0° C. | 85.7:14.3 |
| 27.6° C. | 84.2:15.8 |
| 58.6° C. | 81.6:18.4 |

These data show that the equilibrium shifts in favor of the trans-syn-2-isomer as the temperature is lowered. Selective crystallization of this compound from any of these reaction products can readily be effected at low temperature such as −70° C.

I claim:

1. Method of preparing high purity β-methyl-naphthalene from a mixture of α-methylnaphthalene and β-methylnaphthalene which comprises hydrogenating a mixture of said methylnaphthalenes to form a mixture of methyldecalins comprising mainly cis isomers, contacting the mixture at a temperature in the range of −10° C. to 80° C. with a catalyst selected from the group consisting of an $AlCl_3$-HCl catalyst, an $AlBr_3$-HBr catalyst and an HF-$BF_3$ catalyst, continuing the contacting until at least a major part of the methyldecalins has been converted to methyldecalins essentially comprising a major proportion of trans-syn-2-methyldecalin and a minor proportion of trans-anti-1-methyldecalin, selectively crystallizing trans-syn-2-methyldecalin from the hydrocarbon product at a temperature below −40° C., and dehydrogenating the trans-syn-2-methyldecalin to obtain β-methylnaphthalene in high purity.

2. Method according to claim 1 wherein the trans-anti-1-methyldecalin is recycled to the contacting step for conversion to trans-syn-2-methyldecalin to increase the yield of β-methylnaphthalene.

3. Method according to claim 1 wherein the temperature is in the range of 0–30° C.

4. Method according to claim 1 wherein said catalyst is a pre-formed liquid complex obtained by reacting $AlCl_3$, HCl and paraffin hydrocarbon having at least seven carbon atoms.

5. Method according to claim 1 wherein said catalyst is a pre-formed liquid complex obtained by reacting $AlBr_3$, HBr and paraffin hydrocarbon having at least seven carbon atoms.

6. Method according to claim 1 wherein the catalyst comprises HF, $BF_3$ and an initiator selected from the group consisting of water and organic compounds having not more than 5 carbon atoms selected from the group consisting of olefins, alcohols, ethers and alkyl halides.

References Cited by the Examiner

UNITED STATES PATENTS

| 2,396,331 | 3/1946 | Marschner | 260—666 |
| 2,473,997 | 6/1949 | Hansley | 260—667 |
| 2,683,756 | 7/1954 | Kennedy | 260—666 |
| 2,720,550 | 10/1955 | Danforth | 260—668 |
| 2,734,092 | 2/1956 | Schneider et al. | 260—666 |
| 2,898,387 | 8/1959 | Teter | 260—667 |

OTHER REFERENCES

Slovokhotova et al.: Isomerization of Cyclohexylcyclopentane, Chem. Abstracts, vol. 52, column 3750e, 1958.

Turova-Pollak: Isomerization of Dicyclopentylmethane, Chem. Abstracts, column 21, 8211, 1959.

DELBERT E. GANTZ, *Primary Examiner.*

ALPHONSO D. SULLIVAN, *Examiner.*